May 25, 1943.     H. L. YOUNG     2,320,115
METHOD AND APPARATUS FOR REMOVING THE
STRESSES FROM PLASTIC SHEETING
Filed June 20, 1940     3 Sheets-Sheet 1
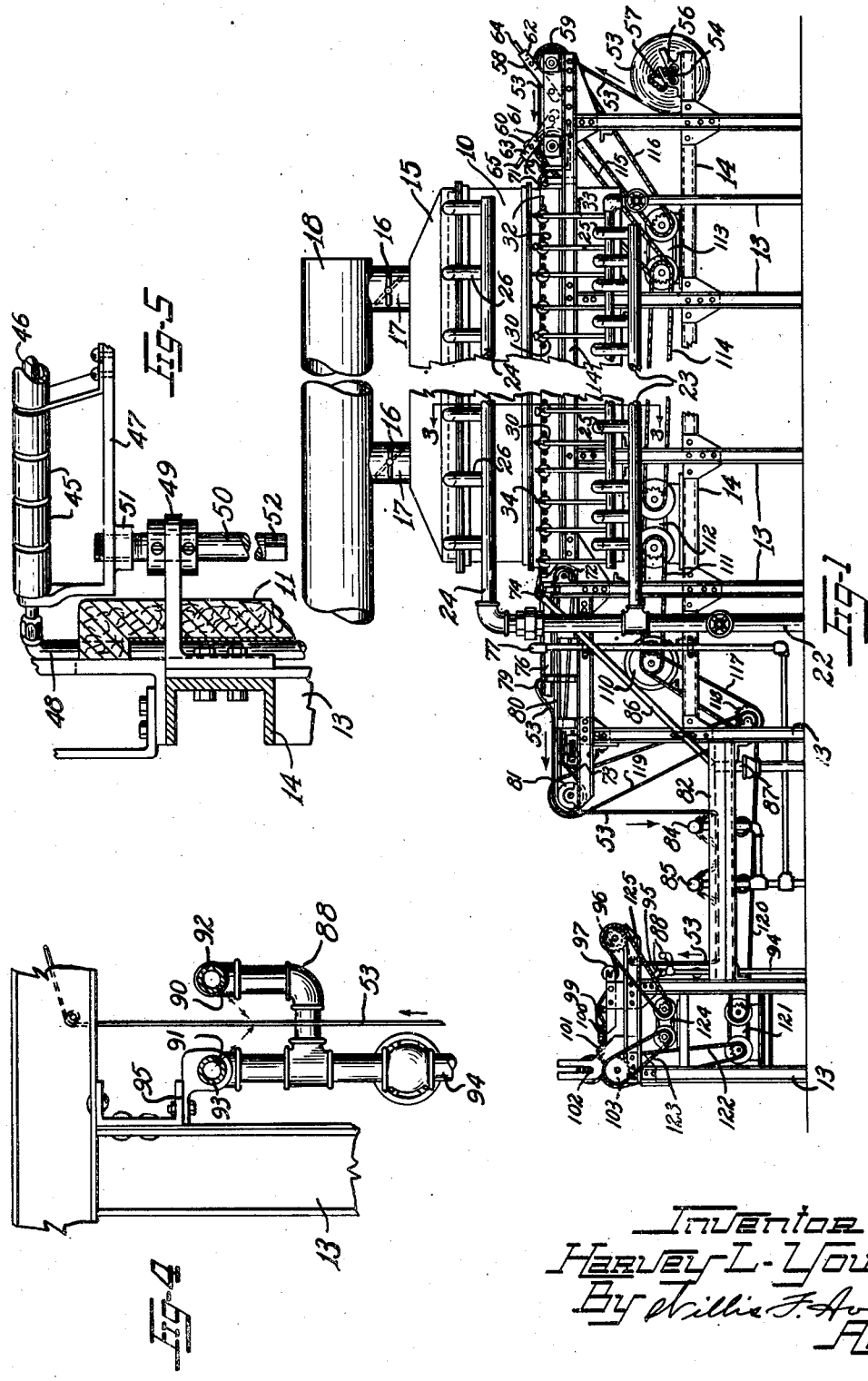

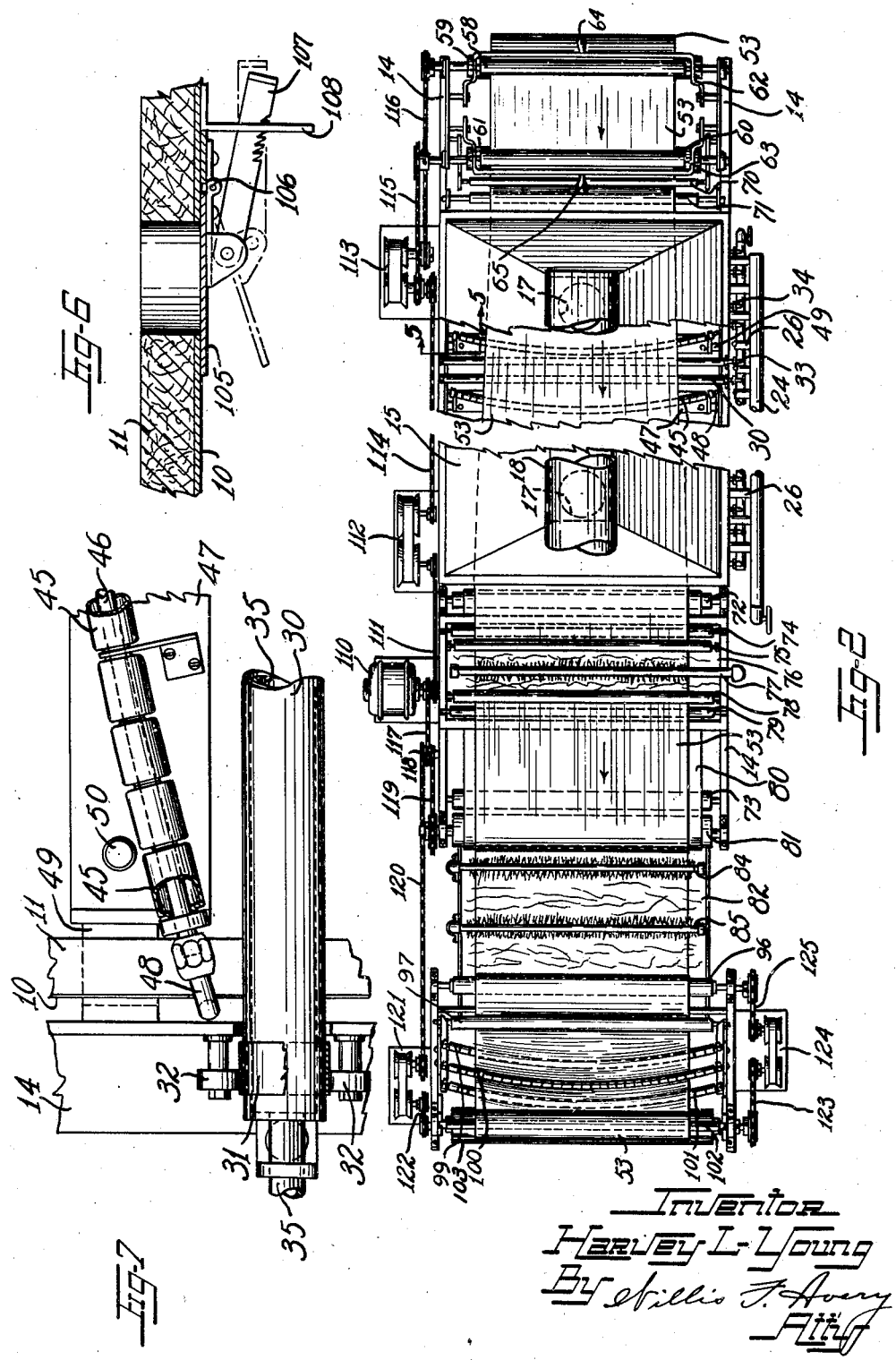

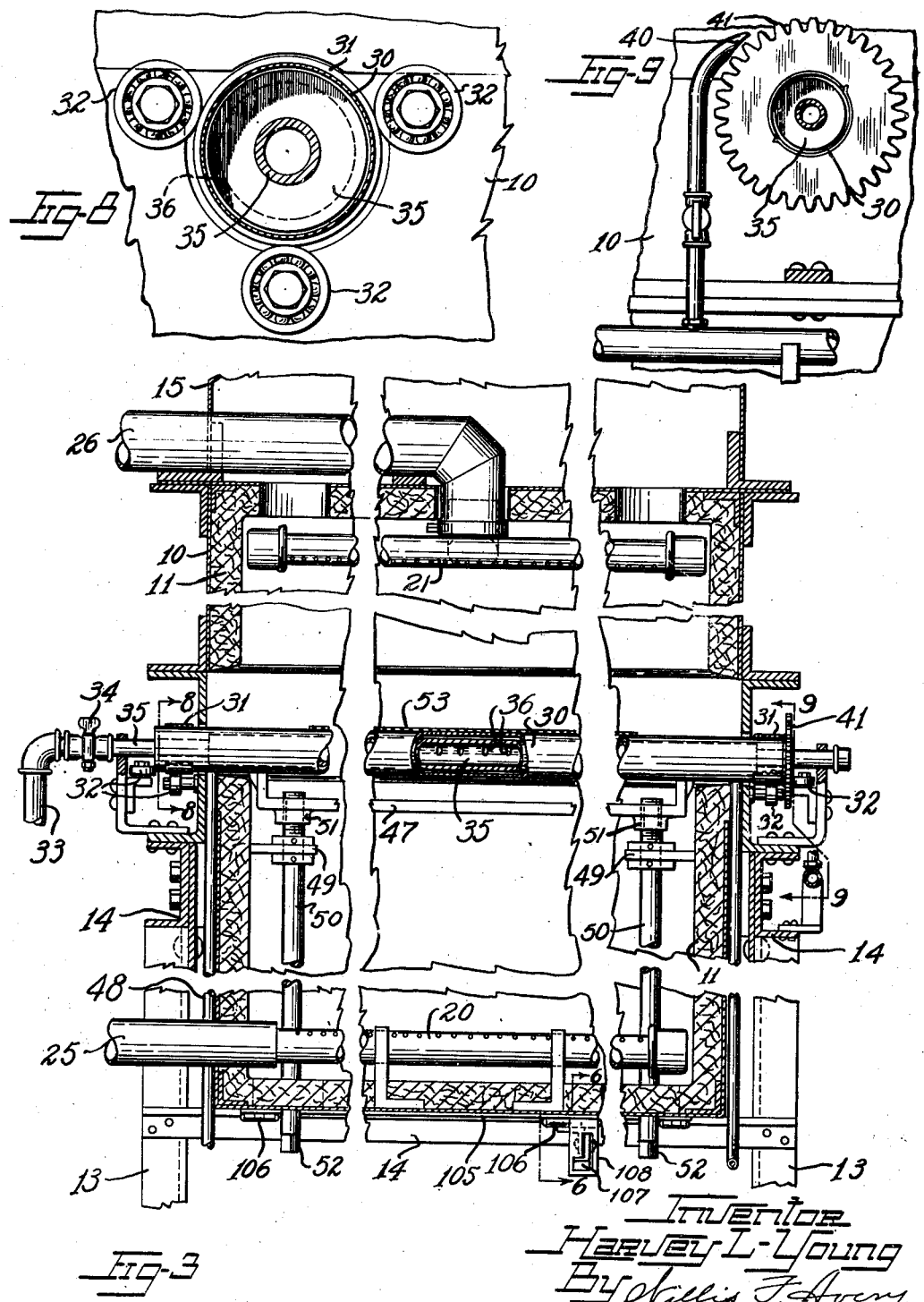

Patented May 25, 1943

2,320,115

UNITED STATES PATENT OFFICE 2,320,115

METHOD AND APPARATUS FOR REMOVING THE STRESSES FROM PLASTIC SHEETING

Harvey L. Young, Akron, Ohio, assignor to The B. F. Goodrich Company, New York, N. Y., a corporation of New York Application June 20, 1940, Serial No. 341,505

7 Claims. (Cl. 18—1)

This invention relates to apparatus for removing the stresses from plastic sheeting.

It is well known that plastic materials which are formed into continuous lengths by calendering or extrusion ordinarily contain residual internal stresses. These stresses are generally believed to be caused at least in part by the fact that the plastic is of necessity deformed in the shaping process so that at the instant it leaves the calender rolls or die, it is considerably stressed. The sudden chilling by contact with the atmosphere prevents or greatly retards further change in shape. The resulting plastic sheeting has a constant tendency to relieve its internal stresses by shrinking longitudinally and becoming wider and thicker, which tendency is ordinarily unnoticeable at room temperatures but becomes very pronounced when the sheeting is heated. Plastic sheeting containing residual calender grain also exhibits an abnormally small longitudinal extensibility and tear resistance.

Prior expedients for shrinking plastic sheet material and removing the internal stresses therefrom have been unsatisfactory for a number of reasons. When the sheeting has been permitted to shrink upon a conveyor or other rigid support, the friction of the sheeting therewith as shrinking occurred has either torn the sheeting or caused it to wrinkle and buckle, thereby introducing additional irregularities. The sheeting must ordinarily be heated to a temperature at which it is very nearly fluid to remove completely the internal stresses, and many difficulties have been encountered due to adhesion of the plastic sheeting to the supporting means at this temperature. It has accordingly proven nearly impossible to produce a uniform, smooth sheeting containing no internal stresses by using apparatus hitherto available.

The chief objects of my invention are to provide means for supporting the sheeting during shrinkage without any frictional drag between the supports and the sheeting; to provide means for conveying the sheeting through the heating zone without subjecting the sheeting to any tension; and to permit the simultaneous longitudinal shrinkage and latitudinal expansion of the sheeting without introducing any irregularities.

I have found that these and other objects may be accomplished by conveying plastic sheet material through a heated oven on a number of rolls which also serve to support the material. These rolls are driven by a frictional driving means so arranged and constructed that when the sheet material shrinks, slippage occurs between the driving means and the roll rather than between the roll and the sheet material. This frictional driving means may include any nonpositive drive in which slippage may occur such as a positively-driven disc with a rough surface in frictional contact with a wheel. In the preferred embodiment of the invention, however, a fluid drive is employed inside the conveying rolls in such a manner that the passage of fluid through the rolls both propels and cools the same as hereafter described.

Of the accompanying drawings:

Fig. 1 is a side elevation of apparatus embodying my invention in its preferred form.

Fig. 2 is a plan view of the apparatus shown in Fig. 1.

Fig. 3 is a section on an enlarged scale taken on line 3—3 of Fig. 1.

Fig. 4 is a still further enlarged side elevation of a portion of Fig. 1.

Fig. 5 is an enlarged section taken on line 5—5 of Fig. 2.

Fig. 6 is an enlarged section taken on line 6—6 of Fig. 3.

Fig. 7 is an enlarged plan view of a portion of Fig. 2.

Fig. 8 is an enlarged section taken on line 8—8 of Fig. 3; and

Fig. 9 is an enlarged section taken on line 9—9 of Fig. 3.

Referring to the drawings, the apparatus of this invention consists of an oven 10 lined with suitable insulating material 11 and supported upon a frame consisting of upright supports 13 connected by horizontal frame members 14. The oven 10 is provided with a hood 15 having dampers 16, 16 in the exhaust pipes 17, 17 leading into the larger exhaust pipe 18 which carries away any fumes.

The oven 10 is heated by a series of gas burners 20 and 21, shown in Fig. 3, in the bottom and top of the oven, supplied with gas by the main gas line 22 which divides into lines 23 and 24 leading to the supply lines 25, 25 and 26, 26 for the individual burners in the oven 10. Other heating means such as radiant electric heaters may be employed in the oven if desired.

Extending across and projecting through the walls of the oven 10 are a number of tubular conveying rolls 30 which are spaced at intervals along the length of the oven 10 to support and convey the plastic sheet through the heating zone. These rolls 30 are preferably made of light metal such as aluminum or an aluminum alloy, and are rotated by a frictional drive adjusted so that when the plastic sheet shrinks, slippage occurs between the frictional drive and the rolls rather than between the rolls and the plastic sheet. In the preferred embodiment herein shown, the rolls are rotated by a fluid drive which serves the double function of cooling the rolls, whereby the sticking of the plastic material to the rolls is prevented, and of providing motive power which rotates the conveying rolls at the exact speed required to move the shrinking plastic through the oven. It will be understood that the variations in the amount of shrinkage of different portions of the plastic necessitate a conveying means having a readily variable speed if the heated shrinking plastic is to be carried through the oven without imparting any stresses to the plastic. The speed of each conveying roll in the apparatus herein described is automatically adjusted at the proper rate because of the method by which the conveying rolls are driven.

As shown in Fig. 8, the tubular conveying rolls 30 are provided at each end of the portion outside the oven 10 with a steel bushing 31 and are supported on both sides of the oven 10 by antifriction bearings 32. The rolls 30 are driven by compressed air which is passed from the supply line 33 provided with the valve 34 through the pipe 35 which extends through the part of the conveying roll 30 inside the oven 10. As shown in Fig. 3, the air is directed through the jets 36 drilled in the pipe 35 tangential to the inner diameter. By this means, air is directed against the wall of the conveying tube 30, thereby cooling and rotating the same. In some cases, and particularly where rather thick sheets of plastic materials are being shrunk, the air issuing through the jets 36 may be insufficient to rotate the conveying rolls 30. In this case, as many of the rolls as necessary may be provided with simple air turbines such as that shown in Fig. 9 consisting of a jet 40 through which air may be passed and impinge on the teeth of the gear 41 attached to the conveying roll 30. Greater power may also be provided by placing vanes on the inside walls of the conveying rolls 30 if desired. Although it has been found most convenient to employ air to drive the conveying rolls 30, other fluids such as water may be employed with the necessary changes in design.

A number of spreading devices to keep the plastic sheet free of longitudinal wrinkles while shrinking are also placed inside the oven at appropriate intervals. The preferred spreading devices are tentering rolls shown in detail in Figs. 5 and 7. A number of hollow rolls 45 are placed on an arcuate tube 46 supported by the frame 47. The tube 46 is connected to a somewhat flexible air supply tube 48, and warm air is blown through the tube 46 while the apparatus is in operation to maintain the tentering rolls 45 at a temperature somewhat below that of the oven to prevent the plastic from sticking to the rolls. Although it is not ordinarily necessary, the tentering rolls 45 may also serve as conveying rolls if jets are provided in the tube 46 to allow the escape of air inside the tentering rolls 45.

The spreading devices may be raised or lowered by rotating the rod 50 threaded to the boss 51 on the frame 47 and journaled in the bracket 49 attached to the frame 13. The rod 50 is provided with a squared end 52 to facilitate application of a tool to rotate the shaft.

At one end of the apparatus, a shaft 54 containing a roll of plastic sheeting 53 is mounted in a slotted bracket 56 attached to the frame member 13, and is held in place by a pin 57 removably mounted in the entrance to the slot in the bracket 56. The plastic sheet 53 is then consecutively passed between presser roll 58 and driven roll 59, and presser roll 60 and driven roll 61. Presser rolls 58 and 60 are mounted in yokes 62 and 63 which are pivotally mounted in the frame members 14, 14, and provided with the handles 64 and 65. Roll 61 is preferably driven at a slightly greater speed than roll 59 to remove any wrinkles from the plastic sheet 53 before it enters the oven 10.

The plastic sheet 53 is then passed under roll 70, over roll 71, and through a slit in the end of the oven 10, and is carried through the oven by the conveying rolls 30. The immediate response of the rolls to changes in length of the plastic sheet 53 manifested by changes in speed of the rolls permits the plastic sheet to pass through the oven without being subjected to any substantial frictional drag, and allows the sheet to shrink freely in any direction necessary for the removal of residual stresses without introducing any new stresses in the sheet. Although the sheet increases somewhat in width, the tentering rolls 45 maintain the sheet free from any longitudinal wrinkles.

The plastic sheet 53, freed from internal stresses in the oven, passes through a slit in the oven 10, over the roll 74 and under guide roll 75 in tank 76 in which it is cooled by a spray of water issuing from the pipe 77. It then passes under guide roll 78, over roll 79 and drops to conveyor belt 80, driven by roll 81, which carries it to a point over second tank 82. Endless conveyor belt 80 also passes around roll 72, and may be tightened or loosened by moving roll 73 toward roll 81 or roll 72. The sheet then drops into the tank 82 where it is again sprayed with water from pipes 84 and 85. An overflow pipe 86 runs from the tank 76 to the tank 82 which is provided with another overflow pipe 87. The preliminary cooling in the first tank 76 prevents deformation of the sheet during its passage to and through tank 82 where it is cooled to room temperature. The sheet 53 is then dried, as shown in detail in Fig. 4, by passing the sheet through an air blast drier 88 which directs streams of air against both sides of the sheet from jets 90 and 91 in pipes 92 and 93 connected to the air-supply pipe 94 and supported by the bracket 95 attached to the frame structure 13. The plastic sheet 53 then passes over the driven roll 96, under the roll 97, over tentering roll 99, under tentering roll 100, over tentering roll 101, and is wound upon shaft 102 by means of positively driven roll 103.

In the bottom of the oven are a number of doors 105, shown in Fig. 6, fastened to the oven 10 by hinges 106, and held in place by a toothed handle 107 which engages a slit in the bracket 108 also attached to the oven 10. These doors are useful for removing from the oven any plastic material which may fall from the conveying rolls, and may be left slightly open for ventilation if desired.

The power mechanism for operating the positively-driven rolls 59, 61, 81, 96, and 103 comprises the motor 110 connected to one end of the apparatus by sprocket chain 111 driving variable-speed transmission device 112, which drives another variable-speed transmission device 113 by means of sprocket chain 114, and by an additional chain 115 also drives roll 61. Roll 59 is driven through the second variable-speed transmission 113 by means of sprocket chain 116. The motor 110 drives the other end of the apparatus by means of sprocket chain 117 driving an idler 118 from which roll 81 is driven by chain 119, and from which another chain 120 drives a variable-speed transmission device 121, which in turn drives roll 103 by means of a chain 122. Roll 103 in turn drives roll 96 by means of sprocket chain 123, variable-speed transmission device 124 and chain 125.

By suitable adjustment of the variable-speed transmissions 112, 113, 121 and 124 the relative velocity of the various portions of the sheet 53 passing through the apparatus are so adjusted as to compensate for the shrinkage of the sheet and assure uniform progress of the sheet at all points of its travel without subjecting it to any substantial tension while it is softened by heat.

The apparatus herein described is very useful for shrinking calendered plastic organic polymers which often contain internal stresses of considerable magnitude. One such material is plasticized gamma polyvinyl chloride, which may be prepared by mixing at room temperature the following ingredients:

| | Parts by wt. |
|---|---|
| Gamma polyvinyl chloride | 58.49 |
| Tricresyl phosphate (plasticizer) | 36.50 |
| Lead silicate (stabilizer) | 1.94 |
| Litharge (stabilizer) | 2.91 |
| Carbon black (stabilizer) | .10 | and homogenizing the mixture on a roll mill or the like for 13 min. at about 230° F., after which it is calendered at about 240° F. on a four-roll calender to form a sheet 33 inches wide and 0.011 inch thick. This plastic sheet is conveyed through the shrinking apparatus described in which the oven 10 is ten feet long at a rate of about fifteen feet per minute. The end of the oven at which the plastic sheet 53 enters is maintained at about 550° F., the middle of the oven is maintained at about 450° F., and the temperature of the oven where plastic sheet leaves is about 350° F. While in the oven, the sheet shrinks longitudinally about 30%, increases in width to about 36 inches and in thickness to about .015 inch. Although the temperature of the plastic nearly reaches its melting point in the oven, the fact that there is practically no frictional drag upon the sheet by the conveying rolls permits shrinkage without tearing the sheet or introducing any new stresses therein.

While I have disclosed a specific embodiment of the apparatus constructed in accordance with the invention and well adapted to the practice of the shrinking process, it is to be understood that various structural changes may be made in the apparatus without departing from the spirit and scope of the invention as defined in the appended claims.

I claim:

1. An apparatus for shrinking plastic sheet material containing internal stresses comprising an oven, means for heating the oven to a temperature at which the plastic material softens and releases stresses, means for supporting and conveying the sheet material through the oven including a series of closely spaced rolls, and individual driving means for the rolls including a continuously operative frictional drive so constructed and arranged that when the sheet material shrinks, slippage occurs between the driving means and the rolls rather than between the rolls and the sheet material.

2. An apparatus for shrinking plastic sheet material containing internal stresses comprising an oven, means for heating the oven to a temperature at which the plastic material softens and releases stresses, means for conveying the sheet material through the oven including a series of rolls extending across the oven in spaced-apart relationship but sufficiently close to support the heat-softened sheet material, and individual, continuously operative fluid driving means for the rolls so constructed and arranged that when the sheet material shrinks, slippage occurs between the driving means and the rolls rather than between the rolls and the sheet material.

3. An apparatus for shrinking plastic sheet material containing internal stresses comprising an oven, means for heating the oven to a temperature at which the plastic material softens and releases stresses, means for conveying the sheet material through the oven including a series of closely spaced rolls, means for spreading the sheet material and preventing longitudinal wrinkles when the sheet material increases in width, and individual driving means for the conveying rolls including a continuously operative frictional drive so constructed and arranged that when the sheet material shrinks, slippage occurs between the driving means and the rolls rather than between the rolls and the sheet material.

4. An apparatus for shrinking plastic sheet material containing internal stresses comprising an oven, means for heating the oven to a temperature at which the plastic material softens and releases stresses, means for conveying the sheet material through the oven including a series of closely spaced tubular rolls extending horizontally through the oven, and spreading means including tentering rolls spaced at intervals throughout the length of the oven, and individual, continuously operative fluid driving means for the conveying rolls so constructed and arranged that when the sheet material shrinks, slippage occurs between the driving means and the rolls rather than between the rolls and the sheet material.

5. An apparatus for shrinking plastic sheet material containing internal stresses comprising an oven, means for heating the oven to a temperature at which the plastic material softens and releases stresses, means for supporting and conveying the sheet material through the oven including a series of closely spaced rolls, and driving means for the rolls including an individual fluid drive for each roll so constructed and arranged that when the sheet material shrinks, slippage occurs between the driving means and the rolls rather than between the rolls and the sheet material.

6. An apparatus for shrinking plastic sheet material containing internal stresses comprising an oven, means for heating the oven, means for supporting and conveying the sheet material through the oven including tubular rolls, and driving and cooling means for the rolls comprising jets of air angularly directed against the inside walls of the rolls, said driving and cooling means being so constructed and arranged that when the sheet material shrinks, slippage occurs between the driving means and the rolls rather than between the rolls and the sheet material.

7. The method of shrinking plastic sheet material containing internal stresses which comprises conveying said sheet material through a heated area on hollow rolls driven and cooled by tangential jets of air impinging on the inside walls of the rolls.

HARVEY L. YOUNG.